W. A. DRYDEN.
Wheel-Cultivator.
No. {108, 31,112}
Patented Jan. 15, 1861
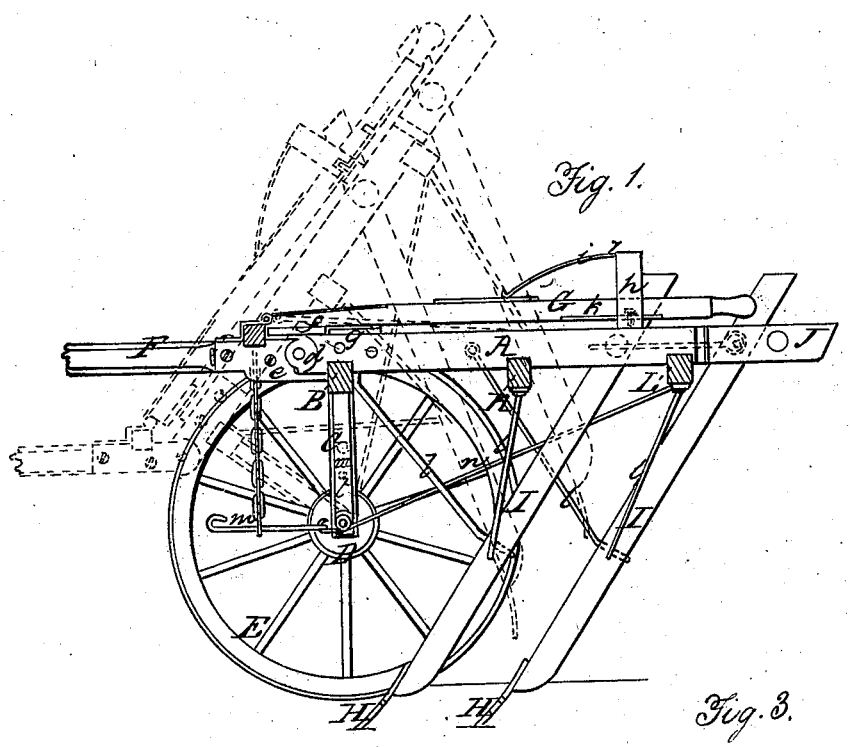
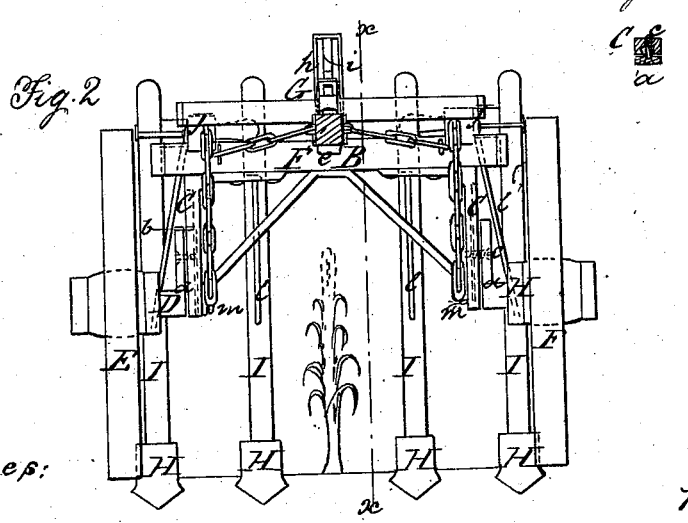
Witnesses:
J. Holcombs
R. S. Spencer
Inventor
W. A. Dryden
per Munn & Co
attorneys

UNITED STATES PATENT OFFICE.

W. A. DRYDEN, OF MONMOUTH, ILLINOIS.

IMPROVEMENT IN CULTIVATORS.

Specification forming part of Letters Patent No. 31,112, dated January 15, 1861.

*To all whom it may concern:*

Be it known that I, W. A. DRYDEN, of Monmouth, in the county of Warren and State of Illinois, have invented a new and Improved Cultivator; and I do hereby declare that the following is a full, clear, and exact description of the same, reference being had to the accompanying drawings, forming a part of this specification, in which—

Figure 1 represents a longitudinal vertical section of my invention, taken in the plane indicated by the line $xx$, Fig. 2. Fig. 2 is a front elevation of the same. Fig. 3 is a transverse section of one of the standards which serve to adjust the height of the cultivator from the ground.

Similar letters of reference in the three views indicate corresponding parts.

The object of this invention is to arrange a cultivator which allows of conveniently adjusting the shares to any desired depth and width, and which enables the operator to throw the shares out of the ground and to keep them elevated when it is desired to turn the machine or to move it from one field to another.

To enable those skilled in the art to make and use my invention, I will proceed to describe its construction and operation with reference to the drawings.

The beam A of my cultivator is supported by the cross-bar B, which connects by means of the pendants C with the axles D of the wheels E. The axles D project from slides $a$, which move up and down in dovetailed grooves $b$ in the faces of the pendants C, and which are retained in the desired position by set-screws $c$. By these means the beam can be raised from or lowered toward the ground, according to the height of the corn.

The draft-pole F is secured to the beam by means of a pivot, $d$, and a plate, $e$, which is firmly attached to the under side of the draft-pole, and which strikes against the under surface of the beam, prevents the draft-pole being turned down independently of the beam, while it allows of turning up said draft-pole without effect on the beam. If the front end of the draft-pole is depressed, the rear end of the beam, together with all the parts attached to the same, is raised from the ground, and the depth to which the shares cut can thus be regulated.

The beam A is prevented from rising spontaneously by a dog, $f$, attached to the under surface of a hand-lever, G, and catching behind a stop, $g$, which is firmly secured on the upper surface of the beam. The lever G is hinged to the rear end of the draft-pole, and it extends over the entire length of the beam. Its rear end is guided by a slotted standard, $h$, which rises from the beam, and a spring, $i$, serves to depress said lever and to prevent it rising up spontaneously. If the rear end of the lever G is raised so as to release the dog $f$ from the stop $g$, the rear end of the beam, together with all the parts attached to it, can be raised from the ground, and a pin, $j$, which projects from the upper surface of the beam, by catching into a hole, $k$, in the lower surface of the lever, serves to retain the beam in its position after it has been raised, as clearly shown in red outlines in Fig. 1.

The shares H are secured by means of inclined standards I to adjustable side beams, J, and said standards are braced and strengthened in their position by means of braces $l$. The side beams, J, are supported by the cross-bars B, K, and L, the cross-bars K and L being firmly secured to the under surface of the beam A.

The three cross-bars B, K, and L are parallel to each other, and the side beams are so arranged that a lateral motion can be given to them, and that they can be adjusted according to the width of the furrow.

The draft animals are hitched to hooks $m$, which connect by means of rods $n$ with the cross-bar L at the rear end of the machine, and the front end of the draft-pole is secured to a bow or cross-bar, which connects the necks of the draft-animals. By raising or lowering the front end of the draft-pole the shares are made to cut deeper or shallower, as may be desired, the beam A being kept firmly in position relative to the draft-pole by means of the plate $e$ underneath and by the dog $f$ on the top.

In order to throw the shares out of the ground the lever G is forced up so that the dog $f$ releases the stop $g$, and the rear end of the beam A, together with the rear ends of the side beams, J, and with the cross-bars K and L, is now raised until the pin $j$ on the beam catches into the hole $k$ in the under surface of the lever G. The shares are thereby retained above the ground, and the machine can be turned or drawn from one field to the other without difficulty.

Having thus fully described my invention, what I claim as new, and desire to secure by Letters Patent, is—

1. The arrangement of the lever G with the dog $f$, in combination with the stop $g$ on the upper surface of the beam A, and with the plate $e$ at the under surface of the draft-pole, constructed and operating as and for the purpose specified.

2. The arrangement of the pin $j$, projecting from the beam A, in combination with a hole, $k$, in the lever G, substantially as and for the purpose described.

W. A. DRYDEN.

Witnesses:
   JOHN T. MORGAN,
   S. R. BOGGS.